INVENTOR.
RAYMOND T. ANDERSON
BY
ATTORNEYS

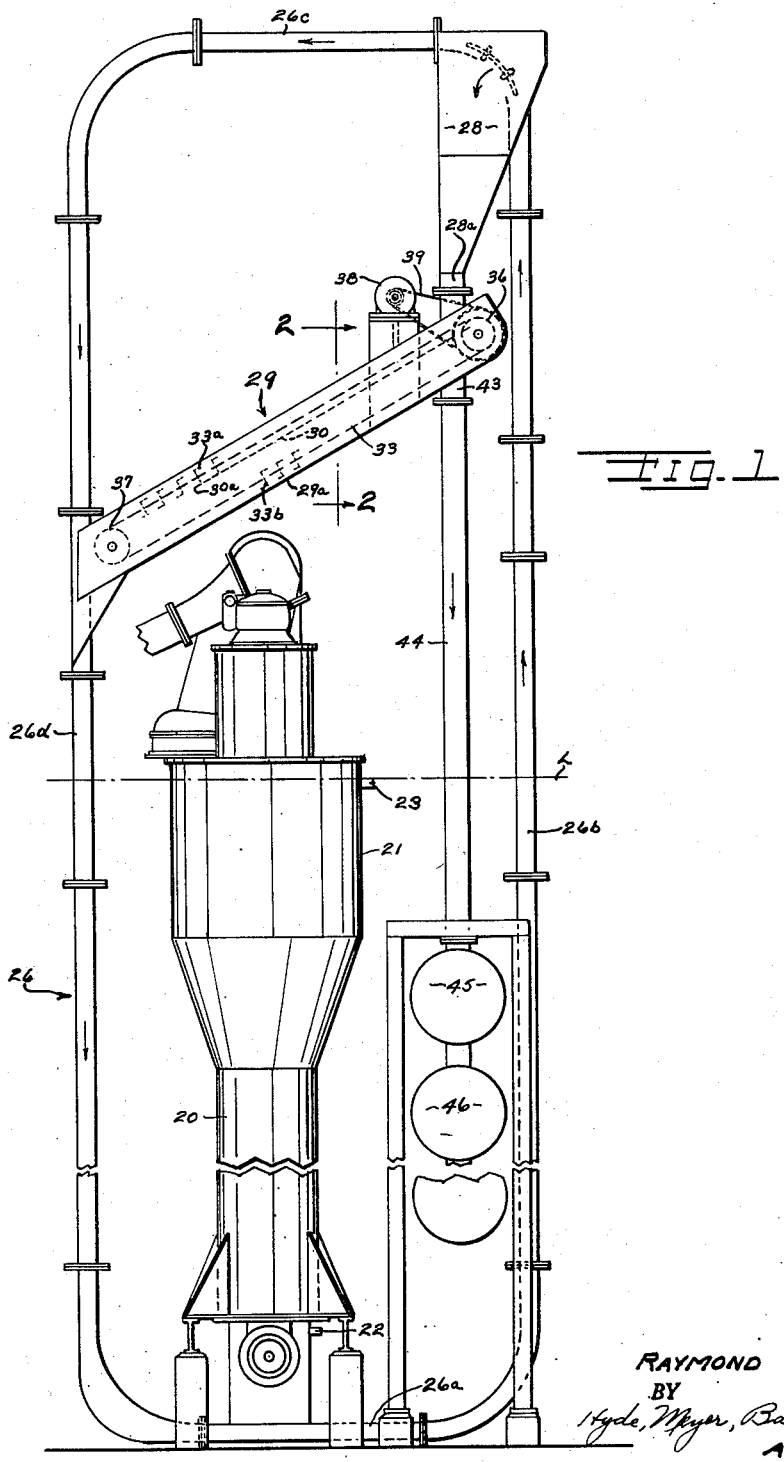

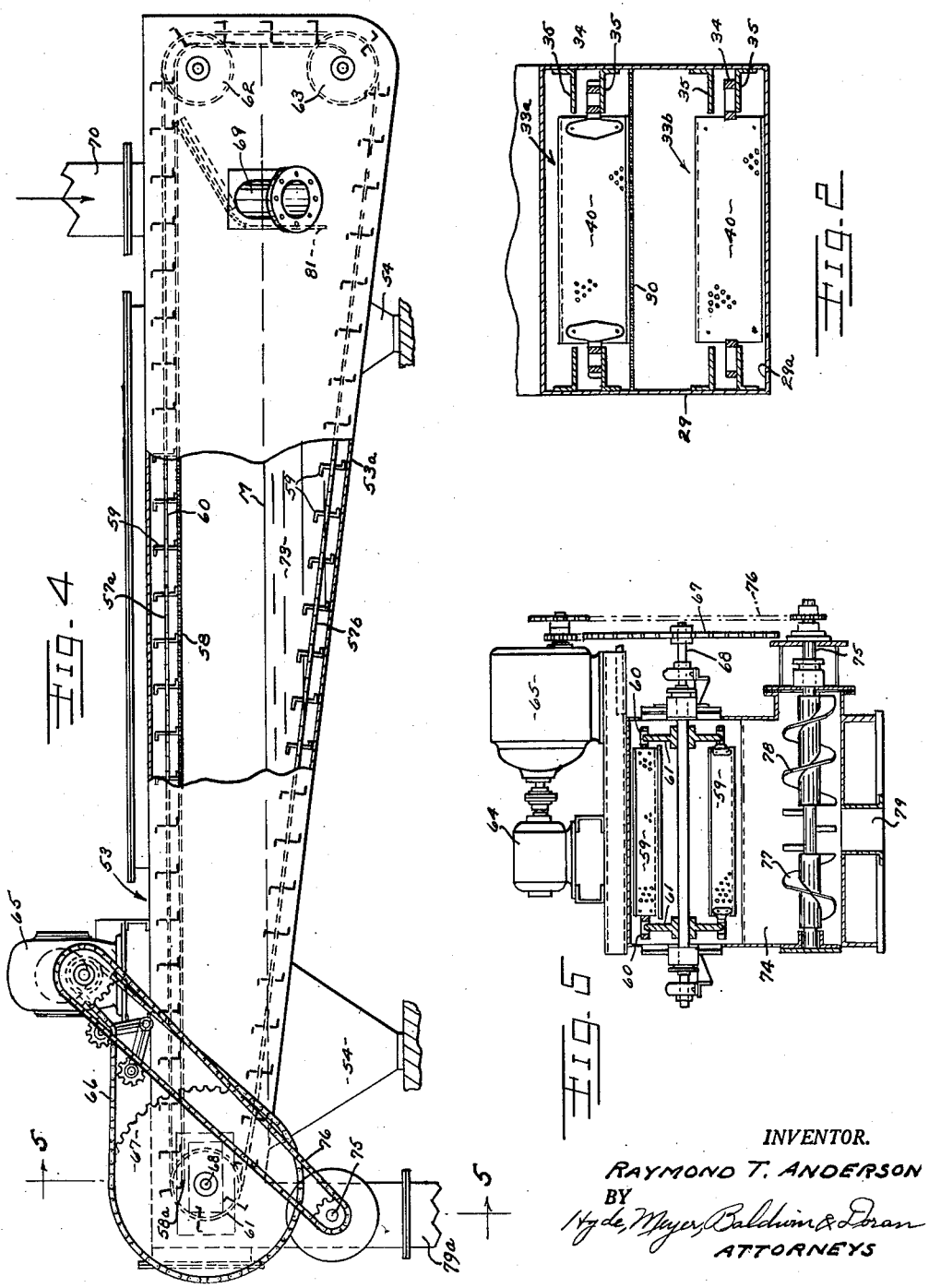

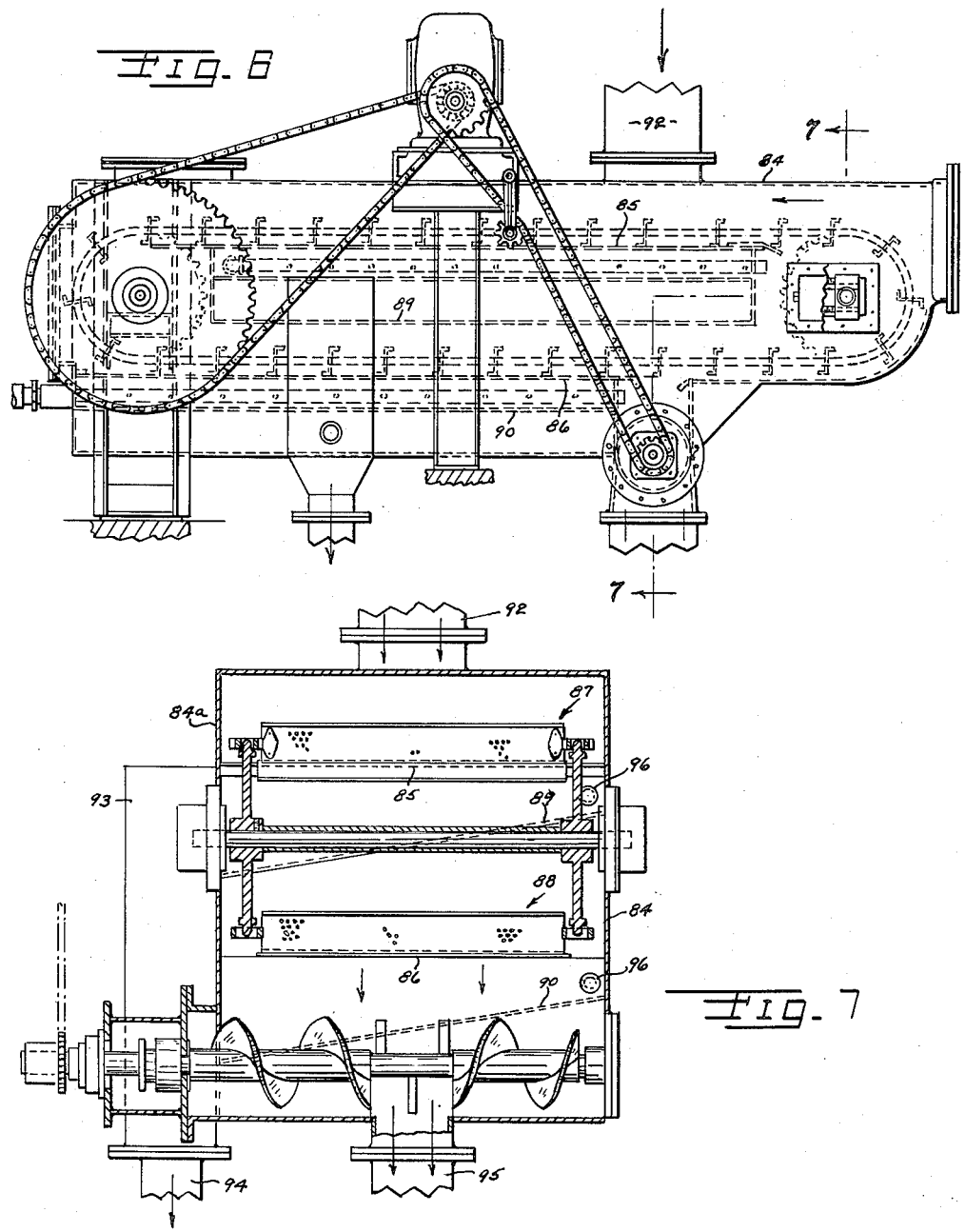

United States Patent Office 2,782,928
Patented Feb. 26, 1957

2,782,928

DRAINAGE DEVICE FOR SOLVENT EXTRACTION APPARATUS

Raymond T. Anderson, Lakewood, Ohio, assignor, by mesne assignments, to International Basic Economy Corporation, New York, N. Y., a corporation of New York Application January 19, 1953, Serial No. 331,814

1 Claim. (Cl. 210—55)

The invention relates to solvent extraction towers such as are used for solvent extraction of oil from seeds or other oil bearing organic material.

The invention more particularly relates to, and has for its object, the provision of novel and improved drainage means for removing drainable liquid from such oil bearing material after it has progressed through and been removed from the solvent liquid. Upon such removal the material is saturated with liquid consisting of oil and solvent, and in the interest of greater efficiency of the process substantially all drainable liquid should be removed before the material progresses to the driers.

As is now known to those skilled in the art, solvent extraction of oil is efficiently accomplished in a vertical, tower-like chamber in which the material descends in counterflow relationship to a rising current of solvent. The resulting mixture of oil and solvent is filtered, or allowed to settle, to precipitate the fines, and the solvent is then recovered by selective evaporation and condensed for re-use. The solid material removed from the extraction tower, and carrying entrained liquid is conveyed to driers. Solvent is also recovered from the drying chambers and condensed and returned to the solvent source.

An object of the present invention is to provide novel and improved drainage means which receives the material before it enters the driers and permits drainage of drainable liquid so as to reduce the amount of liquid conveyed to the driers.

Other objects and advantages will be apparent from a study of the following specification, in conjunction with the accompanying drawings, in which:

Fig. 1 is a side elevational view of an extraction tower and auxiliary elements.

Fig. 2 is a vertical sectional view taken on the line 2—2 of Fig. 1.

Fig. 3 is a side elevational view of an extraction tower showing modified drainage vessel.

Fig. 4 is a view, in side elevation, of the drainage means of Fig. 3, somewhat enlarged and with housing parts broken away to show internal structure, the view being taken from the opposite side of Fig. 3.

Fig. 5 is a sectional view taken on the line 5—5 of Fig. 4.

Fig. 6 is a view of still another drainage vessel, in side elevation.

Fig. 7 is a sectional view taken on the line 7—7 of Fig. 6.

Figure 8:
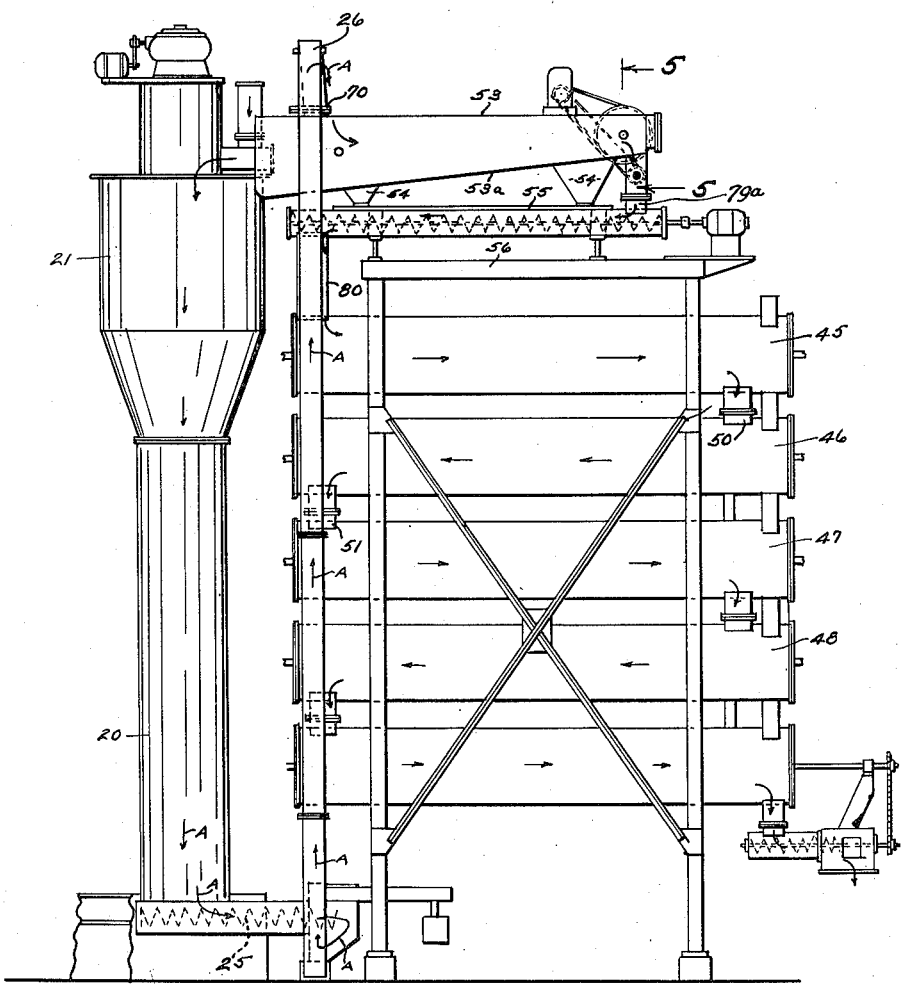

Referring first to Fig. 1, I show an extraction tower 20 of generally cylindrical character having an enlarged upper portion 21 into which the oil bearing material is introduced in any convenient way. Solvent enters the lower part of the tower, for example through pipe 22, and miscella solution consisting of extracted oil and solvent leaves by pipe 23 at the upper end of the tower, thereby establishing a liquid level at the line "L." As previously indicated the miscella proceeds to further operating units (not shown) which may be filters, settling chambers, and distilling and condensing means. This phase of the operation need not be more specifically described since the present invention is concerned with the means which conveys the material from the extracting chamber towards the driers, in combination with the drainage means included in this part of the system.

In the further description of the invention illustrated in Fig. 1, occasional reference may be had to Fig. 3 wherein certain of the auxiliary operating elements are somewhat more clearly shown, although the drainage means of Fig. 3 differs from that of Fig. 1 and will be more specifically described in connection with the second embodiment of the invention.

Means (not shown) is provided for retarding downward settling of the oil bearing material in the solvent liquid. As the material accumulates at the bottom it is moved laterally out of the tower by feed screw means 25 (Fig. 3) which advances the material into the lower horizontal branch 26a of an endless conveyor elevator 26 within which is a chain belt or other means provided with vanes, buckets, or otherwise whereby the material is carried counterclockwise (Fig. 1) upwardly in the upward leg 26b of the elevator. Elevator means of this type is more fully described in my copending application, Serial No. 188,472, now Patent No. 2,663,623, December 22, 1953, filed October 4, 1950, for Solvent Extraction Process and Apparatus. The conveyor is of endless type, moving slowly upwardly in the upward leg 26b, then crosswise in the upper horizontal branch 26c of the elevator, and finally downwardly in the downward leg 26d of the elevator.

Either through cross-communicating pipes (not shown) or through the feed screw housing 25 the liquid in the tower has a common level with vertical liquid columns in the elevator legs 26b and 26d as indicated by liquid level line L. As the sludgy material is lifted above the liquid line L, it begins to lose liquid by rearward drainage in leg 26b. When the material reaches the upper right-hand corner (Fig. 1) it is dropped into a receiving chute 28, and, while still in dripping condition it is delivered downwardly through the neck 28a of the chute into the upper end of an inclined drainage vessel now to be described, and identified in Fig. 1 by reference character 29. In further description of this drainage vessel 29 reference may be had to the sectional showing of the same, in Fig. 2.

The vessel 29 is of elongated box-like character having therewithin a transversely disposed partition or shelf 30 extending longitudinally through a portion, but not all, of the length of the vessel. Within the vessel is an endless conveyor or scraper 33 having an upper flight 33a and a lower flight 33b. The conveyor, in the embodiment of Figs. 1 and 2, has flexible side projections or links 34 traveling between guides 35 and over end sprockets 36 and 37 which are driven from motor 38 by a chain 39. Attached to the links 34 are the scraping blades 40. The conveyor upper flight travels downwardly, scraping along shelf 30 and the lower flight travels upwardly, scraping along the bottom wall 29a of the vessel 29.

At its lower end the vessel 29 opens freely into the downward leg 26d of the elevator.

The operation within vessel 29 is as follows. Material from the elevator, dropping through hopper 28 and neck 28a, falls on inclined shelf 30 and slides or is scraped downwardly along the shelf until it reaches the lower terminal edge of the shelf, at 30a, at which point it drops onto the bottom wall 29a of the vessel and is scraped upwardly by the lower flight 33b of the conveyor until it arrives at the outlet port within fitting 43, and thence through conduit 44 to the uppermost drier 45, and eventually, in sequence, through driers 46, 47, 48, etc.

Liquid drained from the material as it makes the "round trip" through vessel 29, flows downwardly along the bottom wall 29a and into elevator 26d where it returns to the body of solvent in the tower-elevator system. A certain minor amount of solid matter in sludge form runs down into leg 26d with the drained liquid but of course it is not lost. It merely circulates through the elevator 26, is again carried out with the further solid output of the tower, and is eventually redelivered into hopper 28.

Referring briefly again to the drier arrangement as best shown in Fig. 3 it may be stated that solid material which has passed through the drainer is moved laterally in drier 45 in the direction of the arrows, while being mechanically agitated by rotating blades or otherwise, finally falling through a passage in pipe 50, reversing its direction in drier 46 so as to fall through a passage in pipe 51, etc. The driers are heated by steam jackets, or similar convenient means. The evaporated solvent from the driers is condensed for re-use. The dried meal issues from the last drier, and is thereafter disposed of as proves convenient for its ultimate intended use.

It may be noted that the material is thus permitted to make a traverse and reverse trip through a chamber which permits it a more extended drainage period than prior drainage methods wherein the material necessarily advanced at the same speed as the elevator conveyor because it was usually a part of the elevator conveyor. In addition the "round trip" feature of the present drainage conveyor and the cooperating structural parts causes practically a doubling of the drainage time.

A further embodiment of my invention is shown in Figs. 3, 4 and 5.

In this embodiment the drainage vessel 53 is supported on legs 54 on a screw conveyor housing 55 which in turn is carried on frame 56 which also supports the driers 45, 46, etc. Vessel 53 is disposed substantially horizontally although its bottom wall 53a is inclined to the horizontal. Within the vessel is an endless scraper-conveyor 57 having a top flight 57a and a bottom flight 57b, the top flight running above and adjacent to a transversely disposed shelf 58. The scraper blades 59 are carried on a link chain 60 driven from a sprocket wheel 61, there being idler sprockets 62 and 63 where the vertical portion of the chain reverses direction. The chain is driven from a motor 64 through a gear reduction 65, drive chain 66, a sprocket wheel 67 and a shaft 68.

The inclination of the bottom 53a affords a trapped pocket of liquid having a surface M as determined by the outlet pipe 69 which is in communication with the base of tower 20 near inlet 22.

The operation of this drainage embodiment is as follows. Material from the extraction tower is carried upwardly out of the liquid in the ascending leg of elevator 26, as before, and is dropped through neck 70 onto plate 58 along which it is scraped by blades 59, to the left in Fig. 4. The plate is perforated to permit liquid drainage through the plate into pool 73. Any fines settling in the pool are scraped towards the right (Fig. 4) or as shown in Fig. 3, to the left, and then upwardly to repeat the trip along plate 58. Solid material scraped off the end 58a of the plate 58 falls into an end chamber 74 as best seen in Fig. 5, at the bottom of which a transverse shaft 75 is rotatably disposed, being driven by a chain 76 receiving its motive power from reducer 65. The shaft has fixed thereto a pair of worm flights 77 and 78, the pitch of one being reversed, and their cooperating pitches being so disposed as to urge material in chamber 74 towards the outlet port 79 whence it falls through pipe 79a to screw conveyor 55 and is conveyed to conduit 80 into the uppermost drier 45.

The vessel 53 at its deep end has a transverse baffle partition 81 extending down into pool 73 to a point near the bottom, but affording clearance for conveyor 57. The purpose of the baffle is to reduce turbulence in the pool in the neighborhood of the outlet pipe, and permit settling of the fines so that they may be removed by the conveyor. An equilibrium is reached in continuous operation as soon as the fines being added to the pool equal the fines removed both by the conveyor 59, and by outflow of liquid through pipe 69. Certain structural parts of the mechanism herein and in the other embodiments are shown but not specifically described since their purpose is obvious to anyone with elementary mechanical skill.

A further embodiment of the invention is illustrated in Figs. 6 and 7. In this embodiment I show a drainage vessel 84 provided with two vertically-spaced longitudinally-extending shelves 85 and 86, scraped respectively by the upper and lower flights 87 and 88 of the continuous conveyor. Under the upper shelf 85 is an inclined plate 89 and under the lower one is a similar plate 90. In operation the material to be drained is delivered by the elevator (not shown) into pipe 92 and it falls on the upper shelf, which may be a foraminous screen or the perforated plate illustrated. As it is scraped along shelf 85 by the conveyor the liquid drips through shelf 85 onto the inclined plate 89, and flows by gravity through apertures in side wall 84a into a header 93 and downwardly to an outlet pipe 94 whence it is carried to the base of column 20. The partially drained solid falls off the left end of plate 85 (Fig. 6) which is past the left end of plate 89, and is then carried to the right on plate 86 by the lower flight of the conveyor. It falls off the right end of plate 86 into a discharge well similar to that already described for the second embodiment, containing two screw flights of opposed pitch which insure delivery of the material to pipe 95 which goes to the driers.

Above the upper edge of each inclined plate is a pipe 96 running longitudinally and perforated to intermittently or continuously discharge streams of solvent downwardly on the plates 89 and 90 to prevent sticking of fines on the plates.

Here, as in the other embodiments, one of the important features of my invention resides in the fact that the material passing through the drainage vessel does so as part of a continuously moving system, yet it can be made to advance at a greatly reduced rate as compared with the movement of the bulk flow elevator.

What I claim is:

Means for draining an entrained solution of oil and solvent from leached oil-bearing material, said means comprising an enclosure, having side walls and a top and bottom wall, a continuous conveyor within said enclosure and having upper and lower flights traveling in respectively opposed directions, a partition extending longitudinally between said flights and adjacent to said upper flight and extending transversely from one side wall to the other, scraper means carried by said conveyor and disposed to travel along the upper side of said partition in sliding contact therewith, means for admitting liquid-bearing leached material from said elevator onto one end of said partition, the direction of movement of said scraping means being adapted to carry said material along said partition while liquid drains therefrom, means for removing the drained material from said enclosure, means for removing from the enclosure liquid thus drained from said material, said enclosure being inclined at an acute angle to the horizontal, said upper flight being disposed to travel downwardly along the partition and said lower flight being disposed to travel upwardly along the bottom wall of the enclosure, the means for admitting material being above the upper end of the partition, and the means for removing material being adjacent the upper end of the lower flight, whereby the material is first scraped downwardly and then upwardly, said partition terminating short of the lower end of the enclosure whereby material traveling downwardly on the upper side of the partition can fall directly on to the ascending lower flight of the scraper means.

References Cited in the file of this patent

UNITED STATES PATENTS

| | | |
|---|---|---|
| 974,989 | Parker | Nov. 8, 1910 |
| 1,669,973 | Credo | May 15, 1928 |
| 2,273,557 | Bonotto | Feb. 17, 1942 |
| 2,276,298 | Frazier | Mar. 17, 1942 |
| 2,550,947 | Straight | May 1, 1951 |
| 2,627,349 | Hock | Feb. 3, 1953 |
| 2,630,377 | Lewis | Mar. 3, 1953 |